US006408304B1

United States Patent
Kumhyr (10) Patent No.: US 6,408,304 B1
(45) Date of Patent: Jun. 18, 2002

(54) METHOD AND APPARATUS FOR IMPLEMENTING AN OBJECT ORIENTED POLICE PATROL MULTIFUNCTION SYSTEM

(75) Inventor: David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,584

(22) Filed: Dec. 17, 1999

(51) Int. Cl.[7] .............................................. G06F 17/30
(52) U.S. Cl. ...................... 707/102; 707/100; 707/101; 707/103; 707/104
(58) Field of Search ................................. 707/100, 101, 707/102, 103, 104; 705/1

(56) References Cited

U.S. PATENT DOCUMENTS

| | | | | |
|---|---|---|---|---|
| 6,049,272 A | * | 4/2000 | Lee et al. | 340/539 |
| 6,188,329 B1 | * | 2/2001 | Glier et al. | 340/937 |
| 6,233,313 B1 | * | 5/2001 | Farris et al. | 379/34 |
| 6,335,688 B1 | * | 1/2002 | Sweatte | 340/573.1 |
| 2001/0007975 A1 | * | 7/2001 | Nyberg, Jr. et al. | 705/1 |

FOREIGN PATENT DOCUMENTS

| | | | | |
|---|---|---|---|---|
| WO | WO9515051 | * | 6/1995 | H04M/11/04 |
| WO | WO9836548 | * | 8/1998 | H04M/3/22 |

OTHER PUBLICATIONS

National and International Law Enforcement Databases; Works, George; Nov. 19–20, 1996; Proceedings: SPIE—The International Society for Optical Engineering; pp. 134–144.

1993 International Carnahan Conference on Security Technology: Security Technology; Sanson, Larry; Oct. 13–15, 1993; Proceedings: The Institute of Electrical and Electronics Engineers; pp. 159–163.

Human–Computer Interaction: Software and Hardware Interfaces; Salvendy, Gavriel; Proceedings of the Fifth International Conference on Human–Computer Interaction, (HCI International '93), Orlando, Florida, Aug. 8–13, 1993, vol. 2; pp. 512–519.

29th Annual 1995 International Carnahan Conference on Security Technology; Sanson, Larry; Proceedings The Institute of Electrical and Electronics Engineers; Oct. 18–20, 1995; pp. 266–274.

Use Case Blue Freeing Participants to Focus on the Important Issues; Kraus, et al.; Object Magazine; pp. 63–64.

* cited by examiner

*Primary Examiner*—Frantz Coby
(74) *Attorney, Agent, or Firm*—Duke W. Yee; Leslie A. VanLeeuwen; Rudolph J. Buchel, Jr.

(57) ABSTRACT

Initially system data such as radio transmission, computer assisted dispatch, RADAR, VASCAR, car mounted video cameras, digital crime scene cameras, mobile PIN terminal data are encapsulated into a predefined set of base data objects. Text documents such citation, reports and databases are also encapsulated into base data objects. Expertise specialty correlation methods identify correlations between the base data objects and larger objects. These base data objects the attached to larger law enforcement basic function objects for organizing and representing data in a law enforcement environment. An intelligent connector method identifies connections between law enforcement basic function objects allowing the object to interact intelligently with each other based upon their type and the object that it is interacting with. Further, interaction parameters and parameter limits may be specified by the operator for providing a mechanism for specifying/modifying the limits of interactions which could alter the range of the behavior of the objects.

20 Claims, 7 Drawing Sheets

| PERSON OBJECT 702 | VEHICLE OBJECT 704 | CITATION OBJECT 706 | OFFICER OBJECT 708 |
|---|---|---|---|
| INFORMATION OBJECTS | INFORMATION OBJECTS | INFORMATION OBJECTS | INFORMATION OBJECTS |
| NAME:<br>ID NUMBER:<br>D.L. NUMBER:<br>PAROLE NUMBER:<br>FINGERPRINT CLASS:<br>ADDRESS:<br>DESCRIPTION:<br>ALIASES:<br>KNOWN ASSOC.:<br>WANTS:<br>WARRANTS:<br>ARREST RPT NOS;:<br>ooo | LICENSE:<br>OWNER (PERSON):<br>WARRANTS:<br>WANTS:<br>VIN:<br>MAKE:<br>MODEL:<br>YEAR:<br>STYLE:<br>COLOR:<br>DAMAGE:<br><br><br>ooo | CLASS:<br>NAME (PERSON):<br>ID NUMBER:<br>D.L. NUMBER:<br>FINGERPRINT CLASS:<br>ADDRESS:<br>DESCRIPTION:<br>ALIASES:<br>KNOWN ASSOC.:<br>TYPE WARRANT:<br>FELONY/MISDEMEANOR<br>ARREST RPT NUMBER:<br>ooo | NAME (PERSON):<br>NUMBER:<br>RANK:<br>BEAT:<br>EXPERTISE:<br><br><br><br><br><br><br><br>ooo |
| SYSTEM DEVICE OBJECTS | SYSTEM DEVICE OBJECTS | SYSTEM DEVICE OBJECTS | SYSTEM DATA OBJECTS |
| AUDIO DATA:<br>DIGITAL DATA:<br>VIDEO DATA:<br>ooo | AUDIO DATA:<br>DIGITAL DATA:<br>VIDEO DATA:<br>ooo | AUDIO DATA:<br>DIGITAL DATA:<br>VIDEO DATA:<br>ooo | AUDIO DATA:<br>DIGITAL DATA:<br>VIDEO DATA:<br>ooo |

```
public class officer {
    private boolean sworn;
    private string   job;
    private string   rank;
    private string   badgeNo;
    private string   first;
    private string   middle;
    private string   last;
    private boolean supervisor;
    private string   supervisorBadge;
};

public class shift {
    private string badgeNo;
    private string status;
    private date   timeOn
    private date   timeOut;
};

public class report {
    private string   type;
    private string[] badgeNo;
    private date     date;
    private long     ...
```

```
public class incident {
    private boolean   classified;
    private string    reason;
    private date      date;
    private date      incidentDate;
    private string    incident;
    private string    UCR_Code;      //FBI Uniform Crime Reporting code
    private person[]  reportedBy;
    private victim[]  victims;
    private suspect[] suspects;
    private witness[] witnesses;
    private officer[] officers;
    private date      occured;
    private date      lastSecure;
    private string    location;
    private string    premise Type;
    private weapon[]  weapons;
    private MO        mo;
    private property[] property;
    private vehicle[] vehicles;
    private evidence[] evidence;
    private lab Tech[] officer;
    private boolean   insurance;
    private narrative[] narrative;

```
                                    public class person {
        }
        //Derive officer/victim/witness/suspect/
        arrestee...
```

FIG. 10C

```
        public class MO {};

public class weapon {};
        public class vehicle {};
        public class evidence{};
        public class narrative;

}
```

METHOD AND APPARATUS FOR IMPLEMENTING AN OBJECT ORIENTED POLICE PATROL MULTIFUNCTION SYSTEM

TECHNICAL FIELD

The present invention relates to object oriented computer programming. More particularly the present invention relates to a method and apparatus for implementing object oriented programming characteristics in a law enforcement computer system.

DESCRIPTION OF RELATED ART

Currently police patrol vehicles contain many types of devices for normal operation such as radios, scanners, lights, sirens, onboard video, computers and speed measurement devices. Each type of the above mentioned device types may be performed by a variety of contrasting mechanisms that serve some generic police function. Speed measurement device types, for instance include RADAR devices (such as the Genesis series of handheld stationary RADAR guns available from Decatur Electronics, Inc. 715 Bright Street Decatur, Ill. 62522) for radar speed tracking. Alternatively or in combination with a RADAR device a police cruiser may be equipped with a LIDAR device (Light Distance And Ranging such as Stalker Lidar a trademark of and available from Ingram Technologies of West Valley City, Utah) for laser speed tracking. Still in addition a cruiser may also carrier a VASCAR unit (Visual Average Speed Computer And Recorder a trademark of and available from Signal Systems (Pty) Limited P.O.Box 58296 Newville, 2114 South Africa) for computerized speed tracking or VASCAR V PLUS (Visual Average Speed Computer And Recorder Video Plus also a trademark of and available from Signal Systems (Pty) Limited) for computerized speed tracking and video recording. All of the these devices take up space in the patrol cruiser, have different interfaces for the patrol officer to learn and utilize, and more importantly, are not integrated to share information with each other or a central dispatcher.

The problem is best illustrated by an example. A typical traffic stop, for example traveling above the posted speed limit (speeding), is usually initiated by an officer confirming that a vehicle is speeding. Some onboard speed measurement device such as RADAR, LIDAR or VASCAR usually provides the conformation. The speed data that is indicated by the speed-measuring device is valuable evidence that might be used by against the suspect at trial. A stop of the vehicle ensues and the officer performs an information check on the suspect and vehicle. Information obtained from the suspect is called in to a central police dispatch. The officer may communicate with the dispatcher through a variety of means such as a radio or data link. Text and image data may be passed to and from the dispatcher through the data link. During the stop the suspect and suspect's vehicle may be video taped. After consultation with the dispatcher the officer issues a citation or warning to the suspect or alternatively may perform an arrest.

At the conclusion of the traffic stop the only record of the events that transpired prior, during, and after the traffic stop are usually in the form of the citation itself. Should the suspect choose to contest the citation, the officer usually appears in court with a copy of the citation, some hastily scribbled notes about the incident and calibration documentation for the speed measurement device. Any other potential evidence, such as a date-stamped output from the speed measurement device, video of the suspect and communications between the officer and dispatcher, are not produced at trial simply because of the amount of trouble necessary to gather the miscellaneous data from disparate sources. In more serious offenses the jurisdiction will gather the data form disparate sources, but at great expense.

Even though data is available from a variety of sources, it is never integrated into a coherent package usable for other law enforcement functions. Normally, particular types of data are gathered and if a suitable database exists for the data, it is entered in the database. No correlation between dissimilar data types is established in the prior art data gathering systems. With reference to the traffic stop example, driver's license databases may not contain any reference to criminal activity unless that activity directly related to the operation of a motor vehicle and therefore is not available to the officer at the scene. Criminal wants and warrants are often times never entered in a driver's history maintained by an agency in charge of motor vehicles and driver licensing. Therefore criminal information is not normally available to an officer making a routine traffic stop unless the officer specifically requests a criminal information check. Ordinarily the officer calls in the tag and driver license numbers for the vehicle and driver to a centralized dispatcher. The dispatcher then "runs" the numbers in a motor vehicle database for vehicle history information and driver information. Occasionally, the suspect's name and description is checked for "wants" and "warrants" in a national, and state database, however, in minor traffic stops this check is skipped due to the time required for a response. The dispatcher then returns only the requested information. Many times an officer cites person for a minor traffic offense only to find out that the suspect is wanted for a far more serious crime.

Similarly, information related to a recent crime or crime in progress is only available to the officer through the dispatcher. Many times the dispatcher acts as an information filter to the officer because the dispatcher is unaware of the crime or because the dispatcher fails to connect a suspect in a minor traffic violation with another crime. The officer is the best judge as to which information might be pertinent to the traffic stop and yet that officer may never receive important information because no integrated system for sharing information exists in the prior art.

Major crimes are another example of a need for sharing information. Nationally there has been a decrease in the occurrence of serious crimes each year from 1993 to 1999 (as reported by the Federal Bureau of Investigation in its Uniform Crime Report issued Nov. 21, 1999 for the first half of 1999). Even though there is a decrease in the total number of serious crimes being committed in the United States, there is no evidence of a corresponding increase in the percentage of solved crimes. The success rate for solving serious crimes is dismal. The USA Today reports that in November 1999 the success rate for murder continues to hover under 70%. Criminals who commit other serious crimes fare even better with law enforcement. For example, the solution rate for larceny is less than 40%, while a car thief has less than a one in five chance of being prosecuted for an individual act. One reason for the lack of success is that no automated system exists for connecting and sharing related information.

When investigating a major crime, law enforcement officers generate information or "leads" that connect a particular suspect to a crime. Generating leads that are related to a particular crime is a tedious undertaking. A lead has at least one connection to some aspect of the crime; although connecting that lead to a person may be more difficult to establish. Two or more leads may be combined with one another, thus strengthening their connections to the crime. More relevant leads may have numerous connections to the crime and may be combined with numerous other leads. The most probable suspects are those who are connected with more leads.

With respect to the crime of homicide, leads that connect a person with the crime include information relating to a suspect's means, motive, relationship with the deceased and opportunity for committing the crime. Information from a neighbor that a husband is unhappy is information that supports motive. Calls placed from the decease's residence to 911 might also indicate that a husband is unhappy and be combined with the neighbor's information in order to strengthen the motive. Thus the husband is a suspect with a probable motive for committing the crime. An unhappy husband has more connections to the crime and deceased than a stranger does. As more leads are developed showing means and opportunity connections to the husband, the husband becomes even a stronger suspect because of the combination of information supporting the husband's means, motive, relationship with the deceased and opportunity to have committed the crime of homicide.

Solving a crime in accordance with the prior art is manually intensive undertaking. Merely uncovering all the leads connected to the means, motive, relationship and opportunity of a crime is an exhausting chore. Once the leads have been established, more energy must be expended for connecting the leads and all known suspects, otherwise the leads are dead-end leads and useless. Finally, many more man-hours are necessary for sifting through the leads and examining the similarity between the leads connected to a particular suspect.

It would be advantageous to provide a system for police professions that delivers related data without being filtered. It would be further advantageous to provide a system and method for automatically delivering related data that is known to law enforcement.

SUMMARY OF THE INVENTION

The present invention involves creating a physically integrated system utilizing object oriented programming for the exchange of information between individual disparate systems used by law enforcement. Initially system data such as radio transmission, computer assisted dispatch, RADAR, VASCAR, car mounted video cameras, digital crime scene cameras, mobile PIN terminal data are encapsulated into a predefined set of base data objects. Text documents such as citations and reports and databases are also encapsulated into base data objects. Expertise specialty correlation methods identify correlations between the base data objects and larger objects. These base data objects are then attached to larger law enforcement basic function objects for organizing and representing data in a law enforcement environment. A intelligent connector method identifies connections between law enforcement basic function objects allowing the objects to interact intelligently with each other based upon their type and the object that it is interacting with. Further, interaction parameters and parameter limits may be specified by the operator for providing a mechanism for specifying/modifying the limits of interactions that could alter the range of the behavior of the objects.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
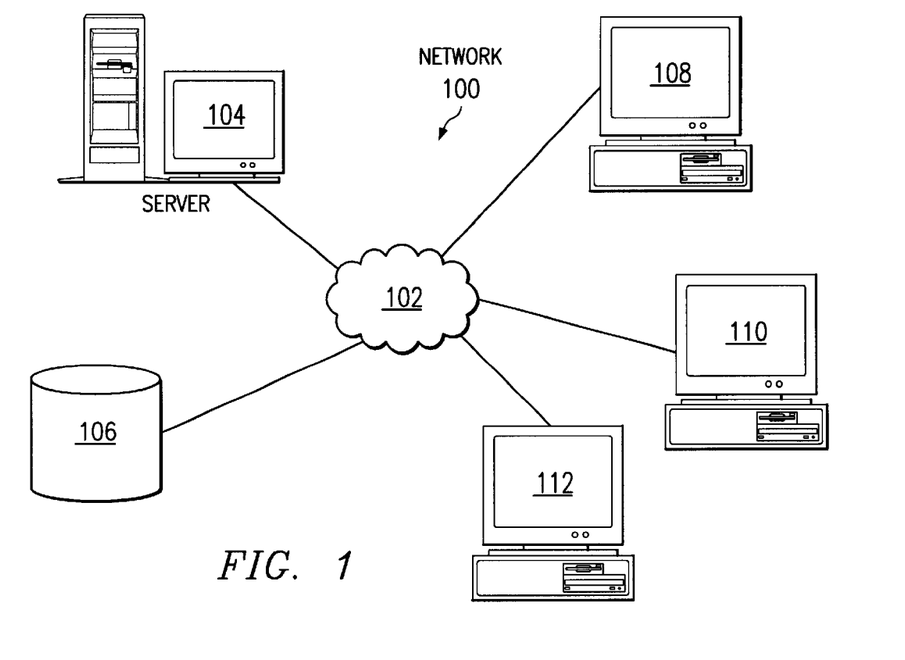
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections but in the particular environment of the present invention may include wire connections for transmitting data to and from patrol vehicles and crime scenes.

In the depicted example, a server 104 is connected to network 102 along with storage unit 106. In addition, clients 108, 110 and 112 also are connected to network 102. These clients 108, 110 and 112 may be, for example, personal computers or network computers. For purposes of this application, a network computer is any computer coupled to a network, which receives a program or other application from another computer coupled to the network. In the depicted example, server 104 provides data, such as boot files, operating system images, and applications to clients 108, 110 and 112. Clients 108, 110 and 112 are clients to server 104. Distributed data processing system 100 may include additional servers, clients, and other devices not shown.

Figure 2:
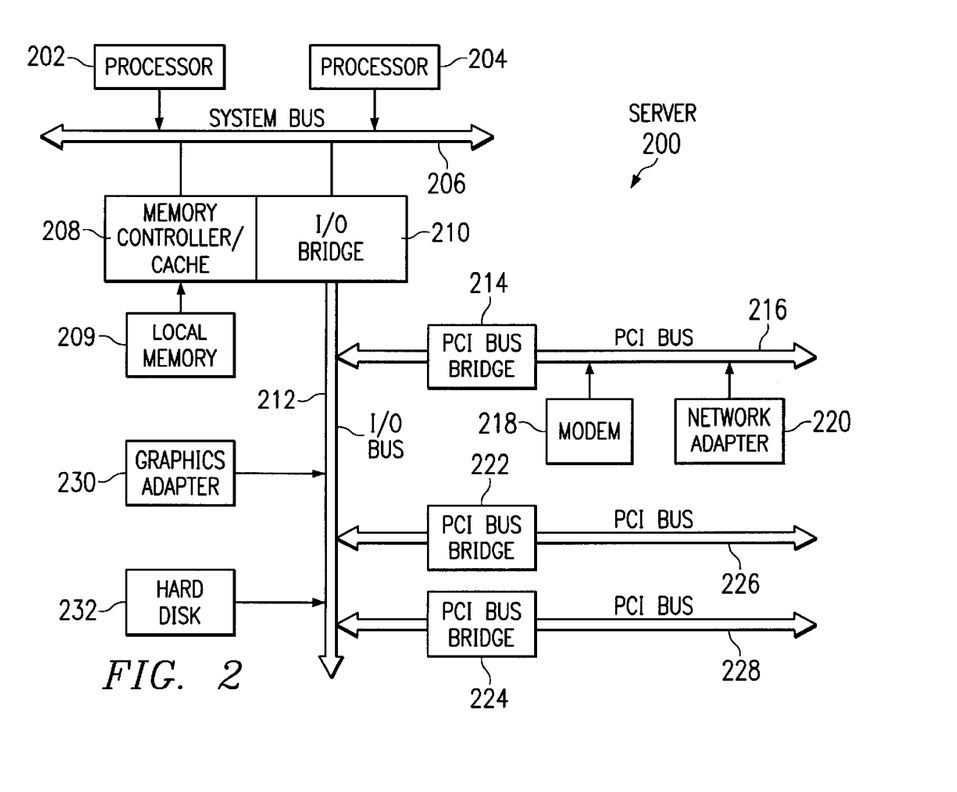
FIG. 2 is a block diagram depicting a data processing system that may be implemented as a server in accordance with a preferred embodiment of the present invention.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, education, and other computer systems that route data and messages. Of course, distributed data processing system 100 also may be implemented as a number of different types of networks, such as, for example, an intranet, a local area network (LAN), or a wide area network (WAN). FIG. 1 is intended as an example and not as an architectural limitation for the present invention. Referring to FIG. 2, a block diagram depicts a data processing system which may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems may be connected to PCI bus 216. Typical PCI bus implementations support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. A memory-mapped graphics adapter 230 and hard disk 232 may also be connected to I/O bus 212 as depicted, either directly or indirectly.

Figure 3:
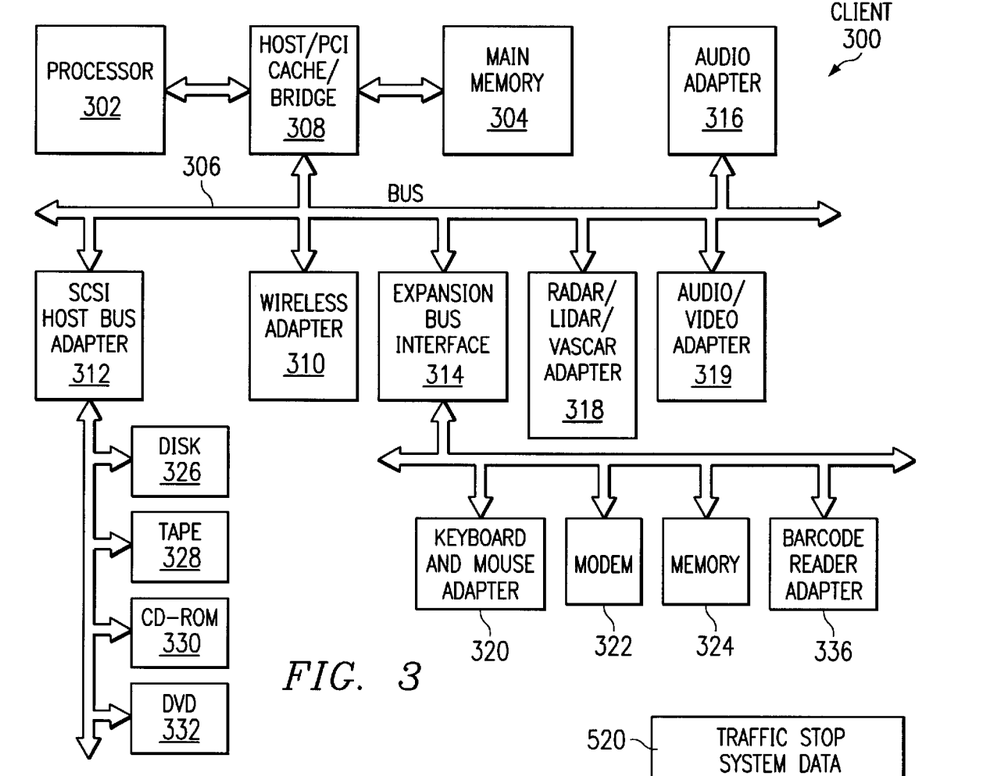
FIG. 3 is a block diagram illustrating a data processing system in which the present invention may be implemented.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system. With reference now to FIG. 3, a block diagram illustrates a data processing system in which the present invention may be implemented. Data processing system 300 is an example of a client computer. Data processing system 300 may be included in a patrol vehicle or in a hand held portable device. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308.

PCI bridge 308 also may include an integrated memory controller and cache memory for processor 302. Additional connections to PCI local bus 306 may be made through direct component interconnection or through add-in boards. In the depicted example, wireless adapter 310, SCSI host bus adapter 312, and expansion bus interface 314 are connected to PCI local bus 306 by direct component connection. In contrast, audio adapter 316, RADAR/LIDAR/VASCAR adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations support three or four PCI expansion slots or add-in connectors.

An operating system runs on processor 302 and is used to coordinate and provide control of various components within data processing system 300 in FIG. 3. The operating system may be a commercially available operating system such as a UNIX based operating system, AIX for instance, which is available from International Business Machines Corporation. "AIX" is a trademark of International Business Machines Corporation. Other operating systems include OS/2. An object oriented programming system, such as Java, may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if optionally configured as a network computer, may not include SCSI host bus adapter 312, hard disk drive 326, tape drive 328, and CD-ROM 330, as noted by dotted line 332 in FIG. 3, denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

Neither the depicted example in FIG. 3 nor the above-described examples are meant to imply architectural limitations.

Figure 4:
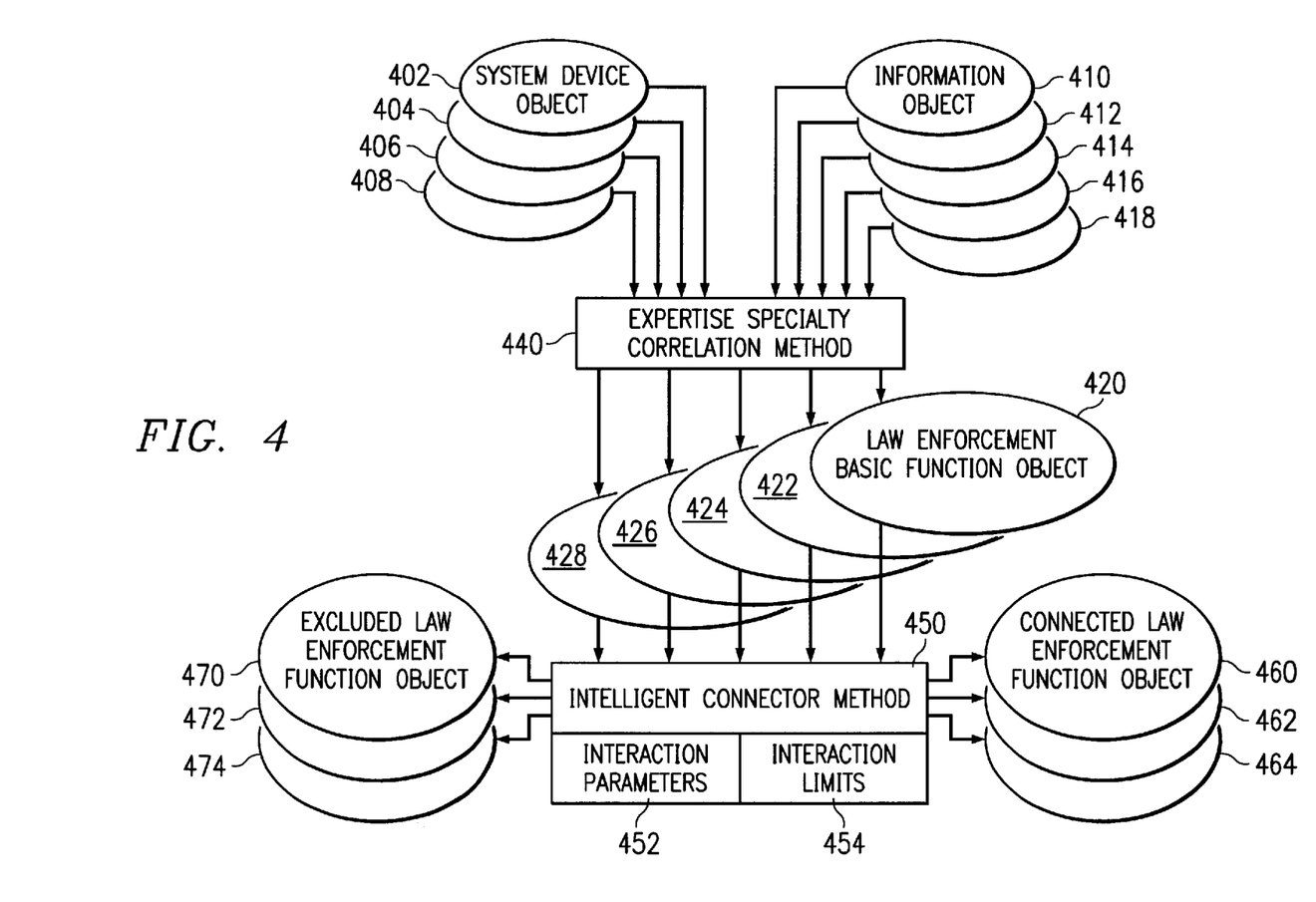
FIG. 4 is a diagram depicting an object oriented police patrol multifunction system for sharing police information in accordance with a preferred embodiment of the present invention.

FIG. 4 is a diagram depicting an object oriented police patrol multifunction system for sharing police information in accordance with a preferred embodiment of the present invention. A preferred embodiment of the present invention is implemented as an object-oriented programming (OOP) application. OOP is a type of programming in which programmers define not only the data type of a data structure, but also the types of operations (functions or methods) that can be applied to the data structure. In this way, the data structure becomes an object that includes both data and functions. In addition, programmers can create relationships between one object and another. For example, objects can inherit characteristics from other objects. One of the principal advantages of object-oriented programming techniques over procedural programming techniques is that they enable programmers to create modules that do not need to be changed when a new type of object is added. A programmer can simply create a new object that inherits many of its features from existing objects. This makes object-oriented programs easier to modify and particularly suited for the present invention. To perform object-oriented programming, one needs an object-oriented programming language (OOPL) such as Turbo C++ Suite v1.0 available form Borland International located in Scotts Valley, Calif.

Base objects may be defined in two basic modes. The first mode is by encapsulating system device-generated data. Radio transmission (arrival/cleared signals or .wav files), computer assisted dispatch, RADAR, VASCAR, LIDAR, car mounted video cameras, digital crime scene cameras, mobile PIN (Police Information Network) terminal data are all encapsulated into one type of a predefined set of objects represented by device objects 402–408. Another type of base object is an information object. Information objects are manually created by defining a text object. Text objects might be generated as entries in an incident report, citation, or some other standard document such as a uniform crime report or an ID. Information objects are represented in the figure as information objects 410–418.

Base objects of either flavor can be combined, connected or attached to larger objects in a object oriented method for organizing And representing data in a law enforcement environment using intelligent connector method 440. Intelligent connector method 440 identifies each base object and then intelligently attaches the base object to a related larger object or set of larger objects. These larger objects, law enforcement basic function objects 420–428, represent basic functions/operations in law enforcement such as citations (traffic, criminal), incidents, arrests, persons (suspects, witnesses, missing persons, arrestees, suspicious persons), and property (found/missing/seized). For example intelligently connecting base objects together as an incident (911 call, news footage, interviews, photos, physical evidence, suspects, IDs, rap sheets, department of motor vehicle (DMV) reports).

Further the system is composed of base objects and law enforcement basic function objects that interact intelligently with each other based upon their type and the type of object that it is interacting with using expertise specialty correlation 450. Interaction parameters 452 are preset by the operator that governs the interaction between the objects. An objective value limit is set for each interaction parameter, interaction limits 454, that filter the interaction between objects based on the specified interaction parameters 452. For example, person objects (law enforcement basic function objects) created as part of an incident report (law enforcement basic function objects) could correlate with person objects created as suspicious persons delivering potential matches for an investigation. However, rather than delivering every possible suspicious person, the interaction between objects is controlled by imposing interaction parameters 452. Temporal and spatial interaction parameters such as a matching time interval and geographic area range might be used in the present example. Programmable values, interaction limits 454, are then assigned for limiting the interaction parameters. In the case of time and proximity, time interval and area range values are chosen for limiting the number of suspicious persons delivered as potential matches for an investigation.

In another example, property objects created in a theft report correlate with property objects created as a part of a normal pawn shop inventory. Again, temporal interaction parameters could be used to limit the property objects delivered as only those objects listed by pawn shops after the time and date of the theft as indicated on the theft report.

Interaction limits on interaction parameters can also be modified to deliver objects that overlap with other objects. Depending on the interaction parameters and limits chosen the overlap objects delivered might either be excluded law enforcement function objects 470–474 or connected law enforcement function objects 460–464. In the above example involving person objects, a person object (law enforcement basic function object) might be delivered as a correlation object (correlation law enforcement function object) based on a parking ticket issued to that person's vehicle that was illegally parked near a crime scene during the time that the crime occurred. However, that person object might also be delivered as an excluded object if that person object based on an arrest report documenting that the person was in police custody at the time of the crime.

Figure 5:
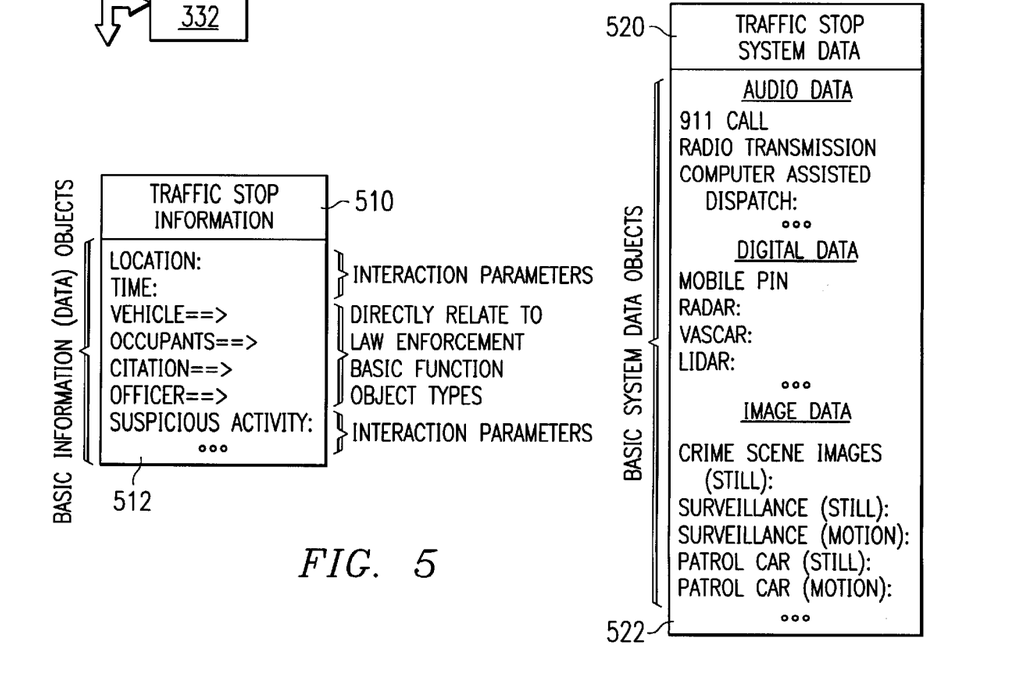
FIG. 5 is a diagram depicting base data objects that might be generated as part of a routine traffic stop involving a minor traffic violation.

FIG. 5 is a diagram depicting base data objects that might be generated as part of a routine traffic stop involving a minor traffic violation. As result of a routine traffic stop, both types of base data objects might be created, i.e. information and system data objects. In the depicted figure, a traffic stop generates a base information object for the traffic stop itself, traffic stop information object 510. Contained within traffic stop object 510, or attached to, are a number of information objects related to the stop, basic information objects 512. Basic information objects 512 are generated from the normal information needed for filing uniform citation form. The information includes information pertaining to location, time, vehicle identification and description, the and possible occupants of the vehicle, any citations, the officer making the stop, and suspicious activity as noted by the officer.

Each bit of information is encapsulated for inclusion in a police patrol multifunction system. Some basic information objects directly relate to law enforcement basic function objects such as vehicle, occupants (persons), citation and officer objects. Other objects are interaction parameters are attached to law enforcement basic function objects and used as comparison data by the intelligent connector method. The intelligent connector method compares the value associated with an interaction parameter basic information object with some predefined interaction limit in order to deliver correlation and exclusion law enforcement function objects.

In addition to traffic stop information object 510, traffic stop system data object 520 is also created during a typical traffic stop. Traffic stop system data object 520 are not information objects that must be manually entered by the officer or police dispatcher, but data outputs from the various sub-systems both incorporated in a police patrol cruiser and external to the cruiser. Traffic stop system data object 520 includes a variety of attached basic system data objects 522. Basic system data object 522 includes audio and video multimedia data as well as digital data objects. In the depicted figure, a traffic stop generates a base information object containing all system data, while traffic stop system data object 520 contains a number of basic system data objects related to the stop, basic system data object 522. Basic system data object 522 is generated from the various sub-systems associated with law enforcement.

For instance, a typical traffic stop might be brought about by a complaint taken from a 911 call. Then the 911 operator communicates the information to the police dispatcher, either voice or data communications. The dispatcher then locates an officer in the area using a computer assisted dispatch sub-system, and then relays that information to the officer by radio or police information network sub-system. After the stop, the suspect and the suspect's vehicle may be rendered on a cruiser mounted video sub-system or even from still images taken by the officer. Other video and still images might also be attached to traffic stop system data object 520, including surveillance images and news video.

Figure 6:
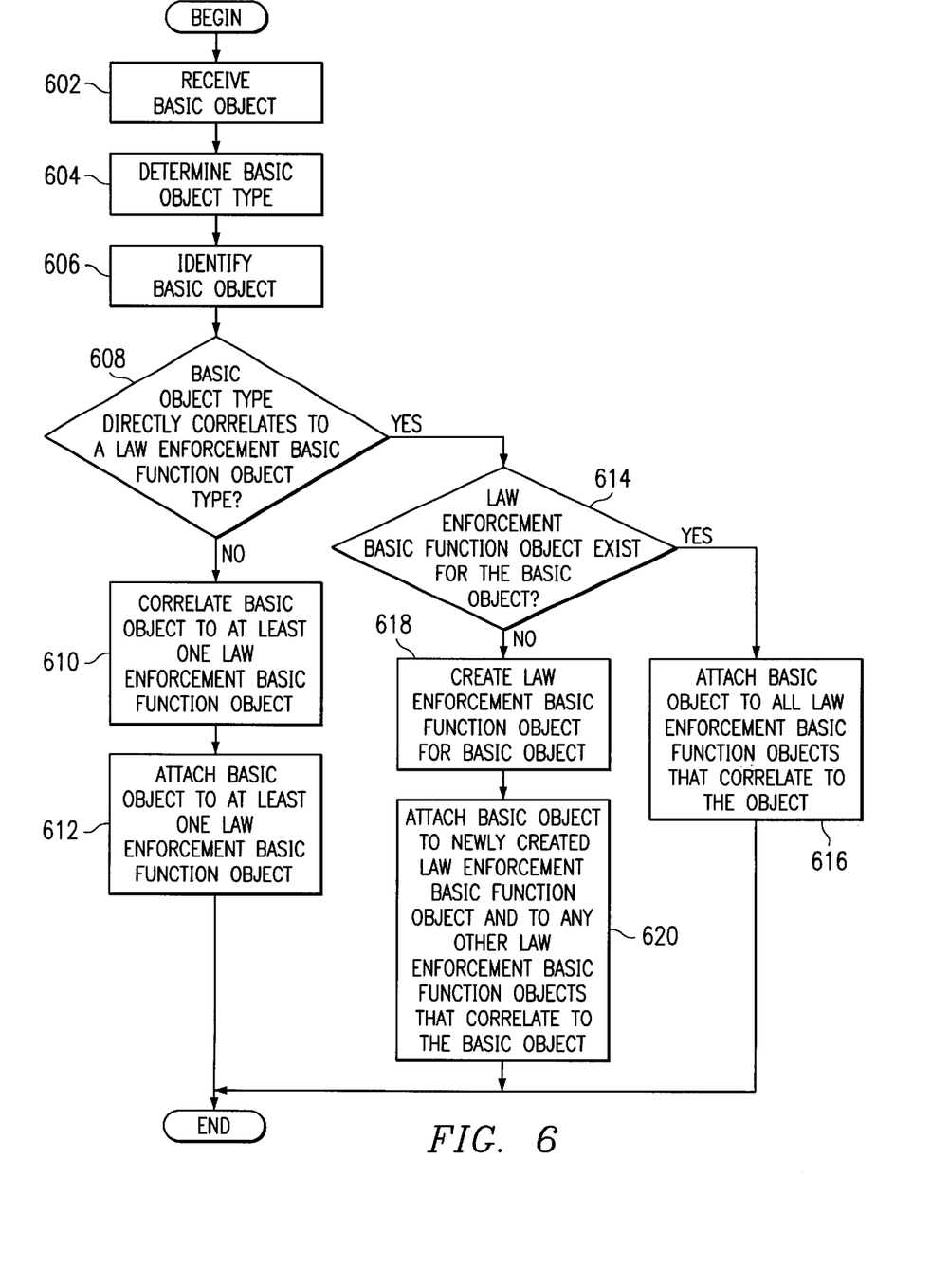
FIG. 6 is a flowchart depicting a process for correlating base objects with law enforcement basic function objects in accordance with a preferred embodiment of the present invention

FIG. 6 is a flowchart depicting a process for correlating base objects with law enforcement basic function objects in accordance with a preferred embodiment of the present invention. The depicted process is performed by the expertise specialty correlation method in an object oriented programming system. The process begins by receiving a basic data object (step 602). The data object can either be a basic information object or a basic system data object. Operators in the expertise specialty correlation method then determine the type of base object received (step 604) and the base object's identity (step 606). The base object may be defined by type and identity in the encapsulation procedure prior to being received by the expertise specialty correlation method. Alternatively, the expertise specialty correlation method may both encapsulate data as it is received and simultaneously type and identify the basic data object.

Once the identity and type of the basic data object is resolved, a determination is made as to whether the base object type directly correlates to a law enforcement basic function object type (step 608). If such a law enforcement basic function object does not exist, the expertise specialty correlation method correlates the base object to at least one basic law enforcement basic function object in existence that relates to the type and identity of the base object (step 610). The base object is then attached to the law enforcement basic function object that correlate to the base object's type and identity (step 612). The process then ends.

Returning to step 608, if a law enforcement basic function object type exists that directly correlates with the type of base object received, then a determination is made as to whether any law enforcement basic function objects exist for the base object received (step 614). If one or more law enforcement basic function objects exist for the base object, then the base object is attached to all law enforcement basic function object that correlate (step 616) and the process ends. Returning to step 614, if a law enforcement basic function object does not exist for the base object then one must be created (step 618). The base object is then attached to the newly created law enforcement basic function object (step 620) and the process ends.

Figure 7:
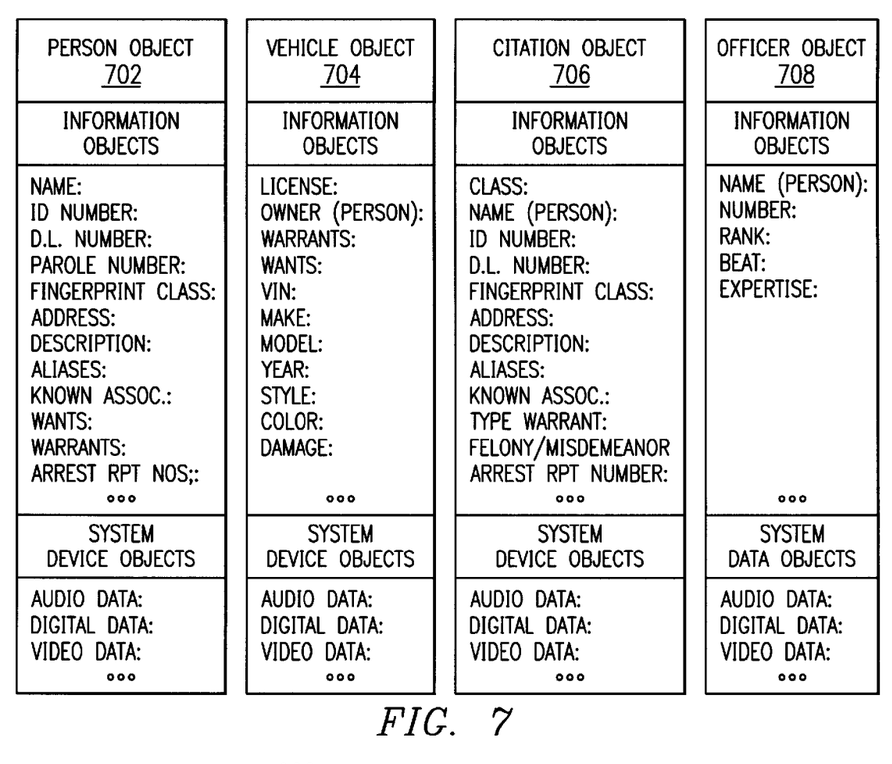
FIG. 7 is diagram depicting exemplary law enforcement basic function objects that may be generated from a typical traffic stop.

FIG. 7 is a diagram depicting exemplary law enforcement basic function objects that may be generated from a typical traffic stop. As was discussed above, person, vehicle, citation and officer objects directly correlated to basic data objects generated at the traffic stop, therefore person object 702, vehicle object 704, citation object 706 and officer object 708 may all be generated in response to a typical traffic stop. Of course, one or all of these law enforcement basic function objects may already exist. In that case the officer is immediately presented with the existing law enforcement basic function objects and the entire correlating basic data objects attached thereto. Any objects may then be modified that the officer is authorized to modify. The officer can also replicate objects, create instances of an object for modifying some of the attached base objects, or may delete or tag incorrect objects for further review by a supervisory. Importantly, the object oriented police patrol multifunction system for sharing police information gives an officer or investigator a tool for modifying objects and thereby creating different scenarios that deliver different result sets of correlating law enforcement basic function objects. The officer can then check those result sets against a suspect or some other known law enforcement basic function object.

Law enforcement basic function objects may be converted from procedural databases and systems for use with the present invention. Such database systems include those available form Application Data Systems, Inc. 1930 First Commercial Drive Southaven, Miss. 38671. Database systems include a master index system for integrated records management for searching for persons, property and vehicles along with a myriad of auxiliary databases such as: property and evidence; field interview and warning ticket; pawn shop control; traffic accident; warrant control; criminal history system; juvenile arrest; confidential informant; domestic violence system; case management system; and personnel control.

Figure 8:
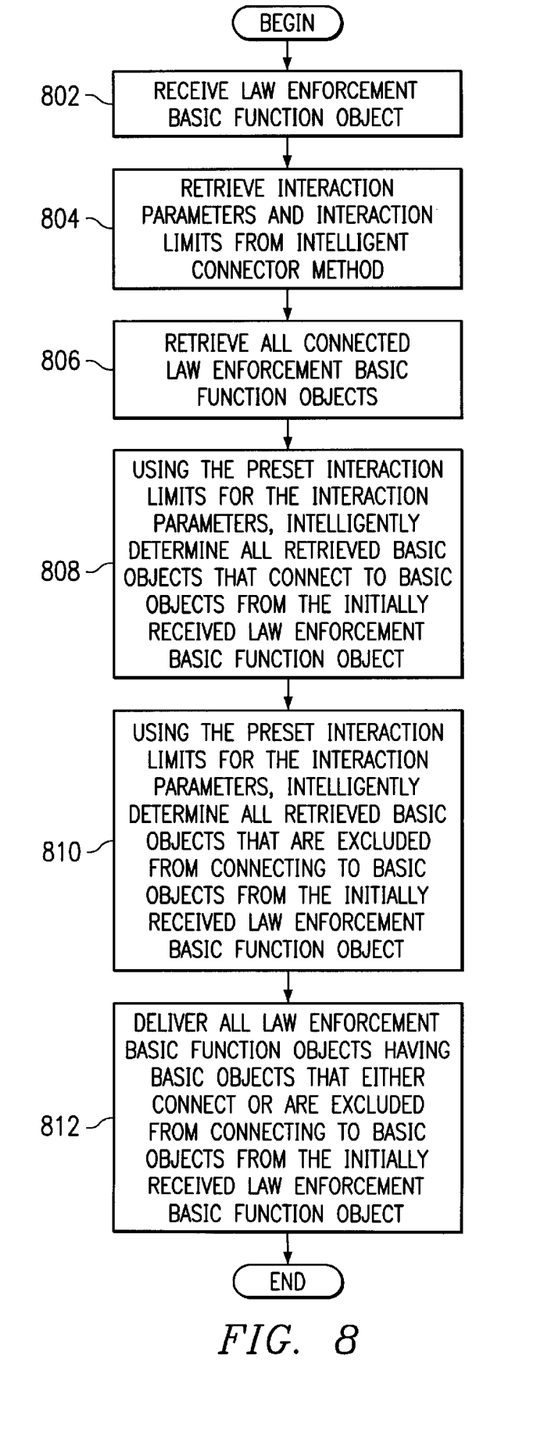
FIG. 8 is a flowchart depicting a process for connecting law enforcement basic function objects with other law enforcement basic function objects in accordance with a preferred embodiment of the present invention.

Once the law enforcement basic function objects are created, the objects can interact intelligently with each other based upon their type and the object that it is interacting with. This functionality is provided by the intelligent connector method. FIG. 8 is a flowchart depicting a process for connecting law enforcement basic function objects with other law enforcement basic function objects in accordance with a preferred embodiment of the present invention.

The process for intelligently connecting law enforcement basic function objects begins by receiving a law enforcement function object (step 802). Interaction parameters and their limits are then retrieved from the intelligent connector method (step 804). Next, all law enforcement basic function objects that have a connection with the initially received law enforcement basic function object are retrieved (step 806).

Clearly, there are cases where this may be a large set of objects, however, the importance of this set is that no object is overlooked, especially in a criminal case. Although, ultimately, it will be determined that the connection to most of the objects is too tenuous to support further investigating, the set of connected objects is available for refining the interaction limits and testing possible crime scenarios. Conversely, in other cases the connection will be immediately relevant to the officer, such as a person object being connected to a citation object or an outstanding warrant object.

Returning to step 808, using the preset interaction parameters, intelligently determine all retrieved base objects that have an interaction connection, within the preset interaction limits, to any base object from the initially received law enforcement basic function object (step 808). Here a subset of base objects is created from the base objects contained in the set of law enforcement basic function objects that have a connection with the initially received law enforcement basic function object.

Next, objects with exculpatory connections are ascertained. Again, using the preset interaction parameters intelligently determine all retrieved base objects that have an interaction connection that falls outside the preset interaction limits (step 810). In some situations setting the interaction parameter limits takes some skill. For example, improperly setting temporal or spatial parameter limits may unintentionally filter objects with a connection or conversely may expand the number of delivered objects beyond the capability of the investigation or on scene officer to handle. However, the interaction parameter limits may also identify objects that cannot have a connection to the initially received law enforcement basic function object and therefore identify any excluded objects. An example of an excluded object might be a person object with a similar descriptive base object that lives near a crime scene and has a criminal history with similar modus operandi, but a time object on an arrest object shows the person to be incarcerated during the time the crime was committed. Finally, all law enforcement basic function objects having basic objects that either connect or are excluded from connecting to basic objects from the initially received law enforcement basic function objects are delivered (step 812). The process then ends.

Figure 9:
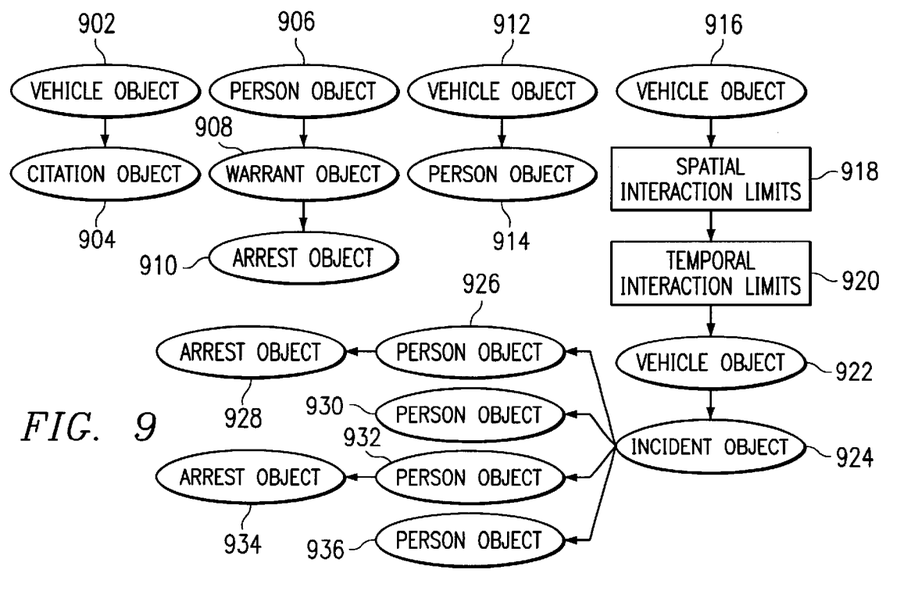
FIG. 9 is a diagram depicting exemplary law enforcement basic function objects that may be delivered based on possible scenarios for correlating objects.

FIG. 9 is a diagram depicting exemplary law enforcement basic function objects that may be delivered based on possible scenarios for correlating objects. As vehicle, occupant (persons), citation and officer base objects from the traffic stop directly correlate to the vehicle, persons, citation and officer law enforcement basic function objects. Therefore, the intelligent connector mechanism can immediately establish connections to like objects using the preset interaction parameter limits. In the first scenario, a connection between vehicle object 902 and citation object 904 is established by the officer merely creating a base vehicle object that identifies the vehicle. The expertise specialty correlation method then correlates the base vehicle object to a preexisting law enforcement basic function object, vehicle 902. From there the intelligent connector method connects vehicle 902 to citation 904 that was issued to vehicle 902. While no action may be necessary by the officer, the officer is made aware of a driver with a reoccurring problem with traffic ordinances.

In the second scenario, the officer creates a base person object that correlates to an existing law enforcement basic function object, person object 904. Person object 904 has a preexisting connection to warrant object 908 and arrest object 910 that are established by the intelligent connector method. Once the expertise specialty correlation method identifies the person object 904, the intelligent connector method identifies connections to warrant 908 and also to citation 910 which precipitated the issuance of warrant 908.

In a third scenario the officer again creates a base vehicle object that correlates to an existing vehicle law enforcement basic function object, vehicle object 912. From vehicle object 912 the owner of the vehicle can be identified by the intelligent connector method from vehicle object 912. Person object 914 is delivered in response to a connection being established to vehicle object 912.

The final scenario is more complete than the prior three scenarios. Here the officer again creates a base vehicle object that is correlated to a law enforcement basic function object, vehicle 916. Next, the intelligent connector method retrieves preset interaction parameters and interaction limits for the parameters. In this example spatial interaction limits 918 and temporal interaction limits 920 are retrieved. Using the interaction limits, the intelligent connector method makes a connection to vehicle object 922. Vehicle object 922 does not contain a complete set of base objects but, instead, is merely descriptive information describing a suspect vehicle that was recently involved in a crime. The officer intending to make the traffic stop is immediately apprised of the situation. In addition to the vehicle description object contained in vehicle object 922, incident object 924 is also delivered by the intelligent connector method to the officer. Incident object 924 describes the known events related to the crime but more importantly has a preexisting connection to person objects 926, 930, 932 and 936. If the incident report that created incident object 924 is incomplete, person objects 926, 930, 932 and 936 will contain little more than a description.

However, if incident object 924 is more complete, person objects 926, 930, 932 and 936 may represent identifiably suspects that may have other preexisting connection such as arrest objects 928 and 934 for person objects 926 and 932. Importantly, incident object 924 may be created entirely for witness descriptions and crime scene evidence, however, in accordance with a preferred embodiment of the present invention incident object 924 might also be a product of investigative research using the features of the present invention. An investigator analyzing a crime involving a vehicle may refine the interaction parameter limitations at the crime scene and thus establish a connection between vehicle object 922 and person objects 926, 930, 932 and 936 that was unknown prior to the investigation. Additionally, the object oriented police patrol multifunction system is extremely flexible allowing for real time updates of law enforcement basic function objects. These updates keep the patrol officers better informed as to suspects currently being sought in connection with a crime because the investigators work is immediately shared with patrol officers.

Figure 10A:
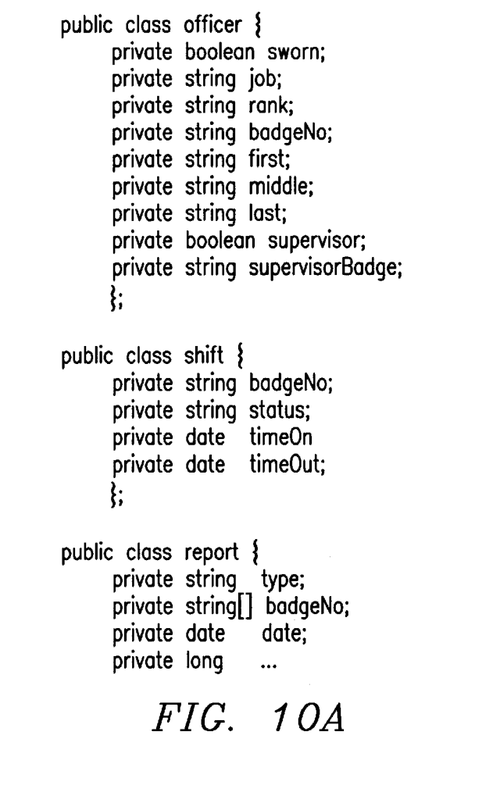
FIGS. 10A–10C are law enforcement basic function objects in code showing the object data structures in Java programming language.
Figure 10B:
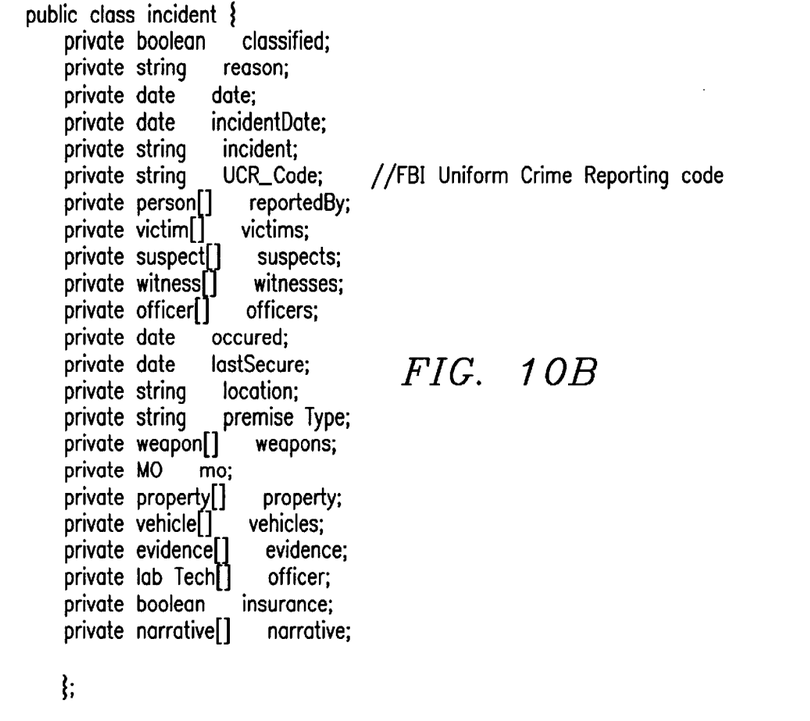
Figure 10C:
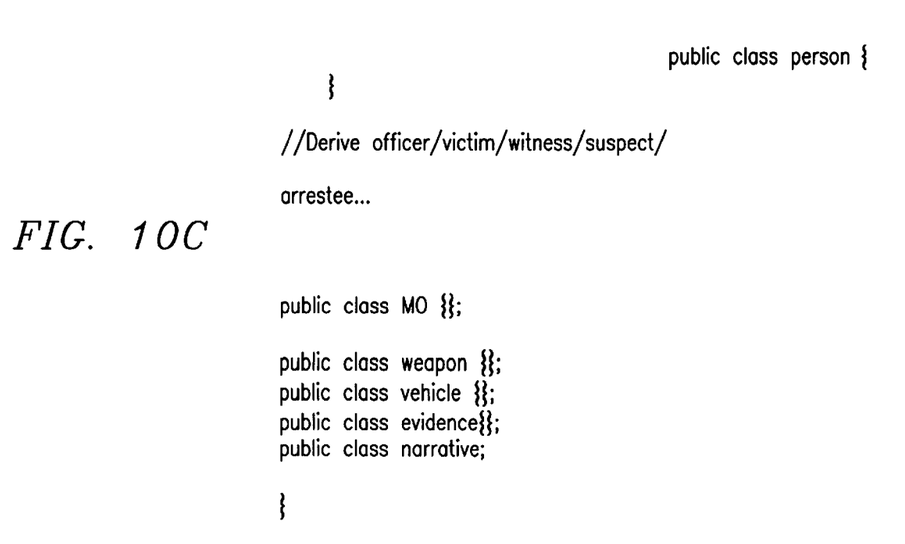

FIGS. 10A–10C are law enforcement basic function objects code showing the object data structures in Java programming language.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such as floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing implemented method for sharing law enforcement information comprising:

receiving law enforcement information;

transforming the law enforcement information into a base law enforcement information data structure;

attaching the base law enforcement information data structure to at least a first law enforcement basic function data structure from a plurality of law enforcement basic function data structures, wherein each of the plurality of law enforcement basic function data structures have at least one attached base law enforcement information data structure;

selecting a second law enforcement basic function data structure from a plurality of law enforcement basic function data structures, wherein the second law enforcement basic function data structure is selected on the basis of the first law enforcement basic function data structure; and delivering the second law enforcement basic function data structure.

2. The method recited in claim 1, wherein attaching the base law enforcement information data structure to at least a first law enforcement basic function data structure further comprises:
   determining a type of the base law enforcement information data structure;
   correlating at least one law enforcement basic function data structure from a plurality of law enforcement basic function data structures based on the type of base law enforcement information data structure; and
   binding the base law enforcement information data structure to the first law enforcement basic function data structure based on the base law enforcement information data structure correlating to the first law enforcement basic function data structure.

3. The method recited in claim 1, wherein attaching the base law enforcement information data structure to at least a first law enforcement basic function data structure further comprises:
   determining a type of the base law enforcement information data structure;
   searching the plurality of law enforcement basic function data structures for the type of the base law enforcement information data structure; and
   creating a law enforcement basic function data structure of the type of the base law enforcement information data structure on the basis of the type not existing in the plurality of law enforcement basic function data structures.

4. The method recited in claim 1, wherein a source for generating the law enforcement information is one of digital, audio and video.

5. The method recited in claim 1 wherein attaching the base law enforcement information data structure to at least a first law enforcement basic function data structure further comprises:
   determining a type of the base law enforcement information data structure;
   determining an identify of the base law enforcement information data structure; and
   binding the base law enforcement information data structure to the first law enforcement basic function data structure, based on both the type and the identity of the base law enforcement information data structure.

6. The method recited in claim 1, wherein attaching the base law enforcement information data structure to at least a first law enforcement basic function data structure further comprises:
   determining a type of the base law enforcement information data structure;
   determining the identity of the base law enforcement information data structure; and
   creating a law enforcement basic function data structure of the type and of the identity of the base law enforcement information data structure on the basis of the type of base law enforcement information data structure existing in the plurality of law enforcement basic function data structures and further on the basis of the identity of the of base law enforcement information data structure not existing in the plurality of law enforcement basic function data structures.

7. The method recited in claim 1 wherein a data structure is an object oriented programming data structure.

8. The method recited in claim 1 wherein selecting a second law enforcement basic function data structure further comprises:
   connecting the first law enforcement basic function data structure to a second law enforcement basic function data structure from a plurality of law enforcement basic function data structures.

9. The method recited in claim 8 wherein connecting the first law enforcement basic function data structure to a second law enforcement basic function data structure further comprises:
   comparing at least one base law enforcement information data structure attached to the first law enforcement basic function data structure to at least one base law enforcement information data structure attached to the second law enforcement basic function data structure.

10. The method recited in claim 1 wherein selecting a second law enforcement basic function data structure further comprises:
    receiving at least one interaction parameter, wherein the at least one interaction parameter relates at least one base law enforcement information data structure attached at least one law enforcement basic function data structure; and
    connecting the first law enforcement basic function data structure to a second law enforcement basic function data structure from a plurality of law enforcement basic function data structures on the basis of the at least one interaction parameter.

11. The method recited in claim 1 wherein connecting the first law enforcement basic function data structure to a second law enforcement basic function data structure further comprises:
    receiving at least one interaction parameter, wherein the at least one interaction parameter relates at least one base law enforcement information data structure attached at least one law enforcement basic function data structure;
    receiving an interactive parameter limit for at least one at least one interaction parameter;
    comparing at least one base law enforcement information data structure attached to the first law enforcement basic function data structure to at least one base law enforcement information data structure attached to the a second law enforcement basic function data structure; and
    connecting the first law enforcement basic function data structure to a second law enforcement basic function data structure from a plurality of law enforcement basic function data structures on the basis of the interactive parameter limit for at least one at least one interaction parameter.

12. The method recited in claim 1 wherein the law enforcement information is information related to one of location, time, vehicle identification, vehicle description, persons, citations, law enforcement persons and activity.

13. The method recited in claim 1 wherein the law enforcement information is information related to one of 911 transmission, police radio transmission, computer assisted dispatch, mobile police information network, commercial television, radar, lidar, vascar, image, video, audio.

14. The method recited in claim 1 wherein the law enforcement basic function data structure is a type of one of person, vehicle, property, citation, officer, warrant and incident.

15. A data processing implemented method for sharing law enforcement information comprising:
    receiving first law enforcement information;
    encapsulating the first law enforcement information into a first base law enforcement information object;

attaching the first base law enforcement information object to a first law enforcement basic function object;

receiving second law enforcement information;

encapsulating the second law enforcement information into a second base law enforcement information object;

attaching the second base law enforcement information object to a first law enforcement basic function object;

storing the first law enforcement basic function object.

16. The method recited in claim 15, further comprises:

receiving third law enforcement information;

encapsulating the third law enforcement information to a third base law enforcement information object;

attaching the third base law enforcement information object to a second law enforcement basic function object;

storing the second law enforcement basic function object.

17. A data processing implemented method for sharing law enforcement information comprising:

receiving first law enforcement basic function object, wherein a first law enforcement basic function object contains at least one base law enforcement information object;

connecting the first law enforcement basic function object to a second law enforcement basic function object from a plurality of law enforcement basic function objects.

18. The method recited in claim 17 wherein connecting the first law enforcement basic function object to a second law enforcement basic function object further comprises:

comparing at least one base law enforcement information object attached to the second law enforcement basic function object to at least one base law enforcement information object attached to the first law enforcement basic function object.

19. The method recited in claim 17 wherein prior to connecting the first law enforcement basic function the method further comprises:

receiving at least one interaction parameter, wherein the at least one interaction parameter relates at least one base law enforcement information object attached at least one law enforcement basic function object.

20. The method recited in claim 17 wherein connecting the first law enforcement basic function object to the second law enforcement basic function object further comprises:

receiving at least one interaction parameter, wherein the at least one interaction parameter relates at least one base law enforcement information object attached at least one law enforcement basic function object;

receiving an interactive parameter limit for at least one at least one interaction parameter;

comparing at least one base law enforcement information object attached to the first law enforcement basic function object to at least one base law enforcement information object attached to the a second law enforcement basic function object; and connecting the second law enforcement basic function object to the first law enforcement basic function object from a plurality of law enforcement basic function objects on the basis of the interactive parameter limit for at least one at least one interaction parameter.

* * * * *